US008090761B2

(12) United States Patent
Apostolopoulos et al.

(10) Patent No.: US 8,090,761 B2
(45) Date of Patent: Jan. 3, 2012

(54) STORAGE AND DISTRIBUTION OF SEGMENTED MEDIA DATA

(75) Inventors: John G. Apostolopoulos, San Carlos, CA (US); Wai-tian Tan, Cupertino, CA (US); Susie J. Wee, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2258 days.

(21) Appl. No.: 10/195,078

(22) Filed: Jul. 12, 2002

(65) Prior Publication Data

US 2004/0010613 A1 Jan. 15, 2004

(51) Int. Cl.
*G06F 15/16* (2006.01)
(52) U.S. Cl. .......................... 709/201; 709/223; 709/232
(58) Field of Classification Search .................. 709/201, 709/223, 232
See application file for complete search history.

(56) References Cited

U.S. PATENT DOCUMENTS

| | | | | |
|---|---|---|---|---|
| 5,586,264 A * | 12/1996 | Belknap et al. | ............... | 725/115 |
| 5,845,279 A * | 12/1998 | Garofalakis et al. | ............... | 707/7 |
| 6,023,720 A * | 2/2000 | Aref et al. | ...................... | 718/103 |
| 6,463,508 B1 * | 10/2002 | Wolf et al. | ..................... | 711/133 |
| 6,557,042 B1 * | 4/2003 | He et al. | ......................... | 709/231 |
| 6,609,253 B1 * | 8/2003 | Swix et al. | ...................... | 725/88 |
| 6,801,940 B1 * | 10/2004 | Moran et al. | ................... | 709/224 |
| 6,842,824 B2 * | 1/2005 | Yamauchi et al. | ............. | 711/133 |
| 6,993,508 B1 * | 1/2006 | Major et al. | ..................... | 705/51 |
| 7,028,096 B1 * | 4/2006 | Lee | ................ | 709/231 |
| 2002/0040639 A1 * | 4/2002 | Duddleson et al. | ............... | 92/52 |
| 2002/0107969 A1 * | 8/2002 | Waldvogel et al. | ........... | 709/231 |
| 2002/0138839 A1 * | 9/2002 | Nihal | ............... | 725/60 |
| 2002/0143852 A1 * | 10/2002 | Guo et al. | ..................... | 709/201 |
| 2002/0184618 A1 * | 12/2002 | Bala et al. | ...................... | 717/148 |
| 2003/0108164 A1 * | 6/2003 | Laurin et al. | ............... | 379/88.01 |
| 2003/0118243 A1 * | 6/2003 | Sezer et al. | ................... | 382/245 |
| 2004/0237032 A1 * | 11/2004 | Miele et al. | ................... | 715/512 |

* cited by examiner

*Primary Examiner* — John Follansbee
*Assistant Examiner* — Nghi Tran

(57) ABSTRACT

A method and system thereof for distributing media data are described. A media segment, selected from a plurality of media segments stored on another node, is received. The media segment includes a portion of an item of media content. The item of media content is segmented according to segmentation characteristics. The media segment is stored in lieu of storing the item of media content in its entirety. The media segment can be forwarded to other nodes.

33 Claims, 6 Drawing Sheets

STORAGE AND DISTRIBUTION OF
SEGMENTED MEDIA DATA

TECHNICAL FIELD

Embodiments of the present invention relate to the field of streaming media data. More specifically, embodiments of the present invention relate to the storage and distribution of media data.

BACKGROUND ART

Before the widespread use of caching in the Internet, an item of content requested by a client was likely provided by the original content server (the source of the content). The content source and the client were typically located at a substantial distance from each other, which often led to slow response times, low bandwidths, high loss rates, and lack of scalability. Response times, bandwidths, and loss rates could also be significantly affected when multiple clients attempted to request an item from the content source at the same time.

Different forms of caching—such as content delivery networks—have helped to overcome these problems for the most part. Generally, content delivery networks place servers nearer to clients (e.g., at the edges of networks). Items of content are replicated and cached at each of the servers. Caching of replicated content on servers closer to clients has resulted in a number of improvements, including reduced response times, higher bandwidths, lower loss rates, improved scalability, and reduced requirements for network (backbone) resources.

Content delivery networks work well when the size of the content is relatively small in comparison to the size of the caches. For example, a Web page is generally much less than a megabyte in size. As such, this kind of content can be practically replicated at each server. Multiple instances of Web content can be stored on each server without the need for substantial memory resources, or without consuming a significant portion of available memory.

However, caching can be problematic when the content includes multimedia data, which can be large in size as well as long in duration. Even a large cache can hold only a few items of multimedia content before getting filled. For example, a video of DVD (digital video disk) quality may be up to 4.7 gigabytes (GB) in size and up to two hours long (based on Moving Picture Expert Group-2 compression). Consequently, a 50 GB cache can hold only about ten DVD-quality videos. Thus, replicating a large number of DVD-quality videos and storing copies at servers closer to clients is not a practical solution for multimedia data. Memories would need to be very large, or only a small number of videos could be stored. On the other hand, storing large items of multimedia content only at a central source or only at a limited number of servers reintroduces the problems mentioned above.

Accordingly, a method and/or system for delivering large items of media content without the attendant problems discussed above would be desirable.

DISCLOSURE OF THE INVENTION

Embodiments of the present invention pertain to a method and system thereof for distributing media data. A media segment, selected from a plurality of media segments stored on another node, is received. The media segment includes a portion of an item of media content. The item of media content is segmented according to segmentation characteristics. The media segment is stored in lieu of storing the item of media content in its entirety. The media segment can be forwarded to other nodes.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
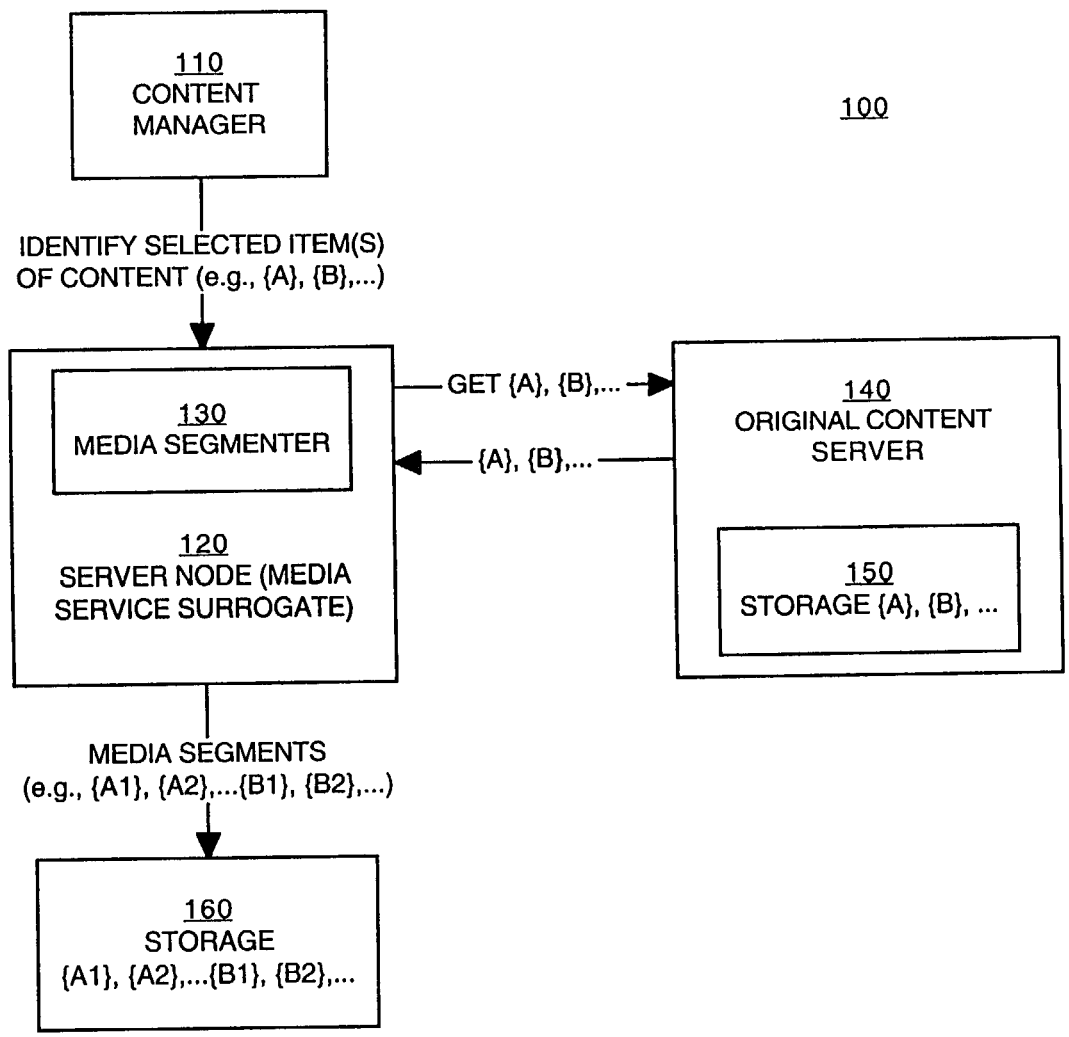
FIG. 1 is a block diagram of an exemplary architecture for segmenting items of media content according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are discussed in the context of multimedia data (also referred to herein as media data or media content). Multimedia data are exemplified by video data accompanied by audio data; for example, in common terms, a multimedia item of content may be a movie with soundtrack. In general, the present invention, in its various embodiments, is well-suited for use with audio-based data, image-based data, Web page-based data, graphic data and the like, and combinations thereof. Also, the present invention, in its various embodiments, is well-suited for use with data that may or may not be encoded (compressed), encrypted or transcoded.

In overview, embodiments of the present invention provide a method and system that more efficiently utilize available cache resources in a manner transparent to requesting clients. In one embodiment, each item of media content (a DVD-quality video, for example) is segmented into a number of media segments according to segmentation characteristics described more fully below. In one such embodiment, those media segments that are most likely to be requested by clients accessing a particular server are stored (cached) at that server.

Thus, instead of storing an item of media content in its entirety at a server, only one or more portions of that item may be stored. Consequently, many items of content can be representatively stored at each server.

For example, in one of the simplest cases, the first portions of each of a large number of items of content can be stored at each server. Alternatively, different portions of different items of content can be stored at each server, where the stored portions are selected based on, for example, their popularity and whether storing them will improve performance and/or reduce costs. Then, while one portion of an item of media content is being forwarded (streamed or otherwise sent) to a requesting client, other portions of that item can be retrieved in the background. Therefore, the item of media content can be forwarded to the client without apparent disruption and hence without the client being aware of whether the entire item is stored on the server, or only a portion is stored.

FIG. 1 is a block diagram of an exemplary architecture 100 for segmenting items of media content according to one embodiment of the present invention. Only a portion of architecture 100 is shown in FIG. 1. As will be seen by the discussion pertaining to the other figures below, architecture 100 can include additional elements. These elements may be used to store and distribute media data as well as encrypt/decrypt, compress/decompress (encode/decode), and/or transcode that data. Also, in the following discussion, the elements of architecture 100 will be described according to the functions they each perform. It is appreciated that functions described as being performed by multiple elements may instead be performed by a single element. Similarly, it is appreciated that multiple functions described as being performed by a single (multifunctional) element may instead be divided in some way amongst a number of individual elements.

Continuing with reference to FIG. 1, in the present embodiment, architecture 100 includes content manager 110 in communication with a server node 120. Server node 120 may also be known as a media service surrogate. Server node 120 includes media segmenter 130. Server node 120 may have the functionality to encrypt/decrypt, compress/decompress, and/or transcode data. Server node 120 is communicatively coupled to storage 160 and original content server 140. Original content server 140 includes storage 150. Original content server 140 may also have the functionality to encrypt/decrypt, compress/decompress, and/or transcode data. As mentioned above, the elements of architecture 100 may be combined. For example, storage 160 may be incorporated into server node 120, media segmenter 130 may reside on original content server 140, and the like.

In the present embodiment, each of the elements of architecture 100 communicate over a wired or wireless network, or over a hybrid network that includes both wired and wireless portions. Although content manager 110 is shown as communicating with server node 120, it may also communicate directly with original content server 140. Furthermore, content manager 110 is in communication with other server nodes (refer to FIGS. 3A and 3B, for example).

In one embodiment, architecture 100 of FIG. 1 is used as follows. Content manager 110 directs media segmenter 130 to segment a particular item of content or a number of such items. For simplicity, only two items of content, referred to as A and B, are discussed; however, it is appreciated that features of the present invention, in each of its embodiments, may be utilized with any number of items of content. Items of content may include items such as movies or live events that have been captured and recorded, or live events that are to be distributed in real time.

In addition, items of content may be differentiated from each other in many different ways. For example, content A may be one movie (one title) and content B another movie (a different title). Alternatively, contents A and B may each be the same movie (same title), but with different characteristics according to the different attributes of downstream (client) devices. Client devices may have different display, power, computational, and communication characteristics and capabilities. Thus, for example, content A may be a movie formatted (e.g., transcoded) for one type of receiving (client) device, and content B may the same movie formatted for another type of client device.

For each item of content, content manager 110 provides information identifying the item (e.g., the item's name) and its location (a Uniform Resource Locator, for example). Also, content manager 110 provides information about how the segmentation is to be performed. For example, content manager 110 may specify the number of segments, the size of each segment, and/or the duration (in time) of each segment.

In the present embodiment, in response to the direction provided by content manager 110, media segmenter 130 requests the specified items of content from original content server 140. Original content server 140 retrieves the requested items of content from storage 150 and sends them to media segmenter 130 (that is, to server node 120). Note that, as mentioned above, content manager 110 could instead communicate directly to original content server 140, and as such could direct original content server 140 to send particular items of content to media segmenter 130. Also, note that media segmenter 130 may request/receive the entire item of content or some portion thereof. Furthermore, in the case of real-time content delivery (of a live event, for example), media segmenter 130 may directly receive the real-time video feed.

In the present embodiment, media segmenter 130 segments the item(s) of content. For simplicity of discussion and illustration, the segmented data for item of content A are represented as media segments {A1}, {A2}, etc., and the segmented data for item of content B are represented as media segments {B1}, {B2}, etc.

As mentioned above, content A may be one item of content and content B another item of content, or content A and content B may correspond to the same item of content but with different characteristics for use with different client devices having different attributes and capabilities. Consider an example in which content A is encoded at a first bit rate and content B is encoded at a second bit rate (this discussion is also applicable to other attributes such as spatial resolution, etc.). In that case, a switch can be made from one bit rate to another at the segment boundaries. That is, a requesting device may receive media segment A1 followed by media segment B2. This may be useful for time-varying channels or when there is a portion of content that a user would like to see with higher quality relative to another portion of content.

In one embodiment, the segmented data are stored in storage 160. Although a single storage 160 is shown, it is appreciated that there may be any number of such storage elements. Each of these storage elements may be populated with the same or with different segmented items of content.

In an alternate embodiment, the segmented data are sent directly to various server nodes (e.g., server nodes 210 and/or 230 of FIGS. 3A and 3B) in addition to or as an alternative to storing the segmented data in storage 160. For example, in the case of a real-time event that is known to be popular and so will likely be accessed by a large number of users in real time, segmented content can be directly distributed to server nodes that in turn forward the segmented data (media segments) to requesting client nodes.

In various embodiments, each item of media content is segmented into a number of segments in a fixed or in an adaptive manner. Generally, each item of media content is segmented in its entirety; that is, all portions of an item of media content are included in the media segments such that the assembled segments yield the entire item of media content. In fixed segmentation, the items of media content are segmented according to some standard set of segmentation rules. In adaptive segmentation, the number of segments and the length of each segment are determined by a number of factors including: the characteristics of the item of media content itself, the characteristics of the device(s) where the segments will be stored, and a predicted frequency of use of each item of content and each portion of each item of content (e.g., their popularity). As will be seen, information describing the frequency of use of items of content and media segments, the attributes of receiving devices (client nodes), and the attributes of storage devices can be accumulated and provided to content manager 110 of FIG. 1, for example. This information can be used by content manager 110, or some other centralized entity, to determine which items of content are to be segmented, how they are to be segmented, and where the media segments are to be stored. As the information is updated, content manager 110 can adapt its decisions according to the most recent information as well as historical trends.

As mentioned above, for adaptive segmentation, factors such as the characteristics of the item of media content itself, the characteristics of the device(s) where the segments will be stored, and a predicted frequency of use of each item of content and each portion of each item of content are considered. Considering the first of these factors, the boundaries of the media segments (e.g., the start and stop points of the segments) are chosen such that the resulting segmentation is "friendly to the media." For example, for compressed media data, the segmentation boundaries can be selected to coincide with units of media data that are independently decodable. Segmenting data in this manner can facilitate features such as distortion-free random access into a stream of media data. The independently decodable units of media may correspond to: Group-of-Pictures boundaries, the spacing between I-frames, frame boundaries, and/or independently decodable units within a frame (e.g., Groups-of-Blocks or slices or video packets), depending on the particular compression standard being used. As such, should delivery of the selected item of content be interrupted (e.g., the second segment is delivered but the third segment is late), the receiving (client) node will still have received a decodable unit. Thus, the client node will be able to display a picture (static or moving) without significant distortion or without crashing because each segment provides the necessary data for complete decoding of the content within that segment.

Intelligent selection of media segment boundaries is particularly well-suited for media data not designed or captured with segmentation in mind. For example, a live event will not necessarily be recorded in a manner that readily allows the media data to be divided into independently decodable units. In such cases, the segmentation boundaries are intelligently selected to nevertheless segment such media data into independently decodable units.

Figure 3A:
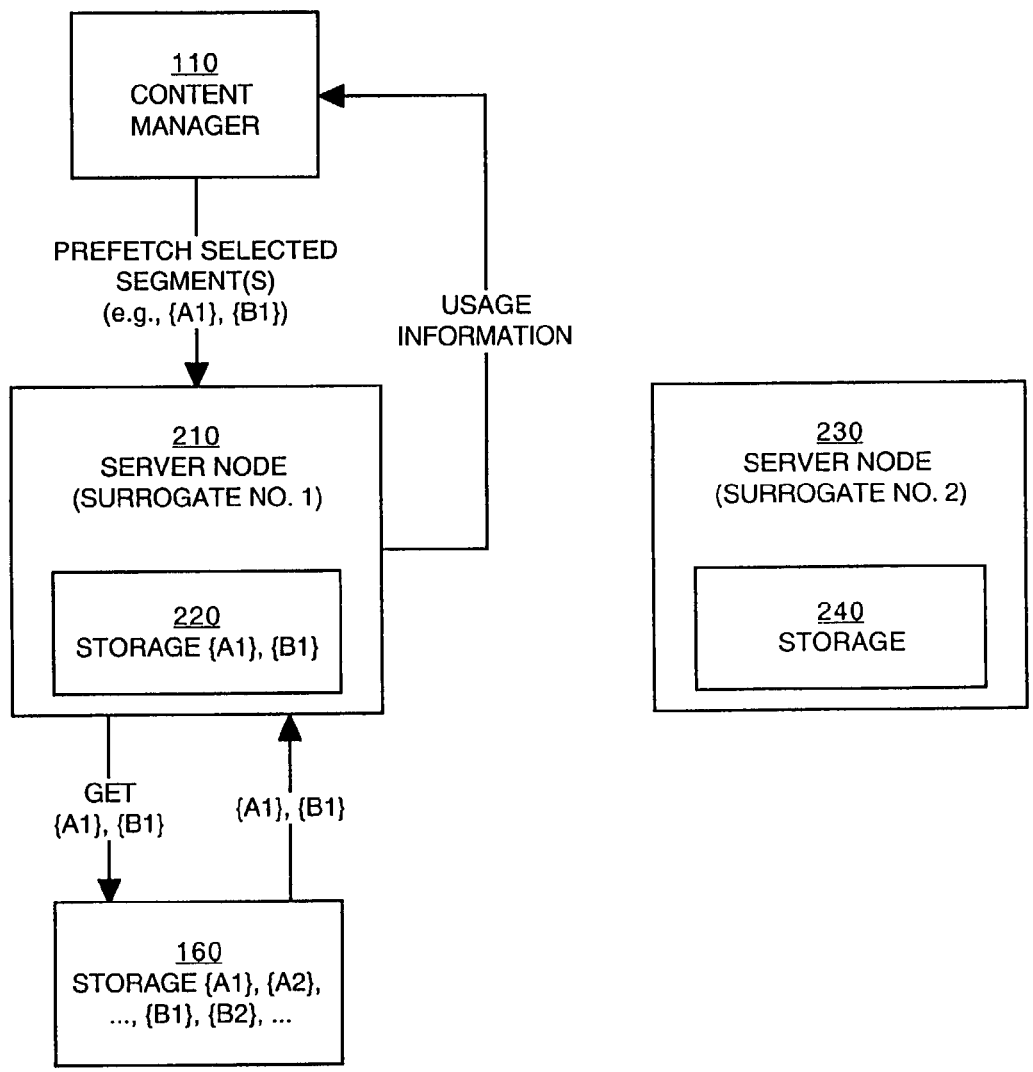
FIGS. 3A and 3B illustrate a data flow for populating caches with media segments according to one embodiment of the present invention.
Figure 3B:
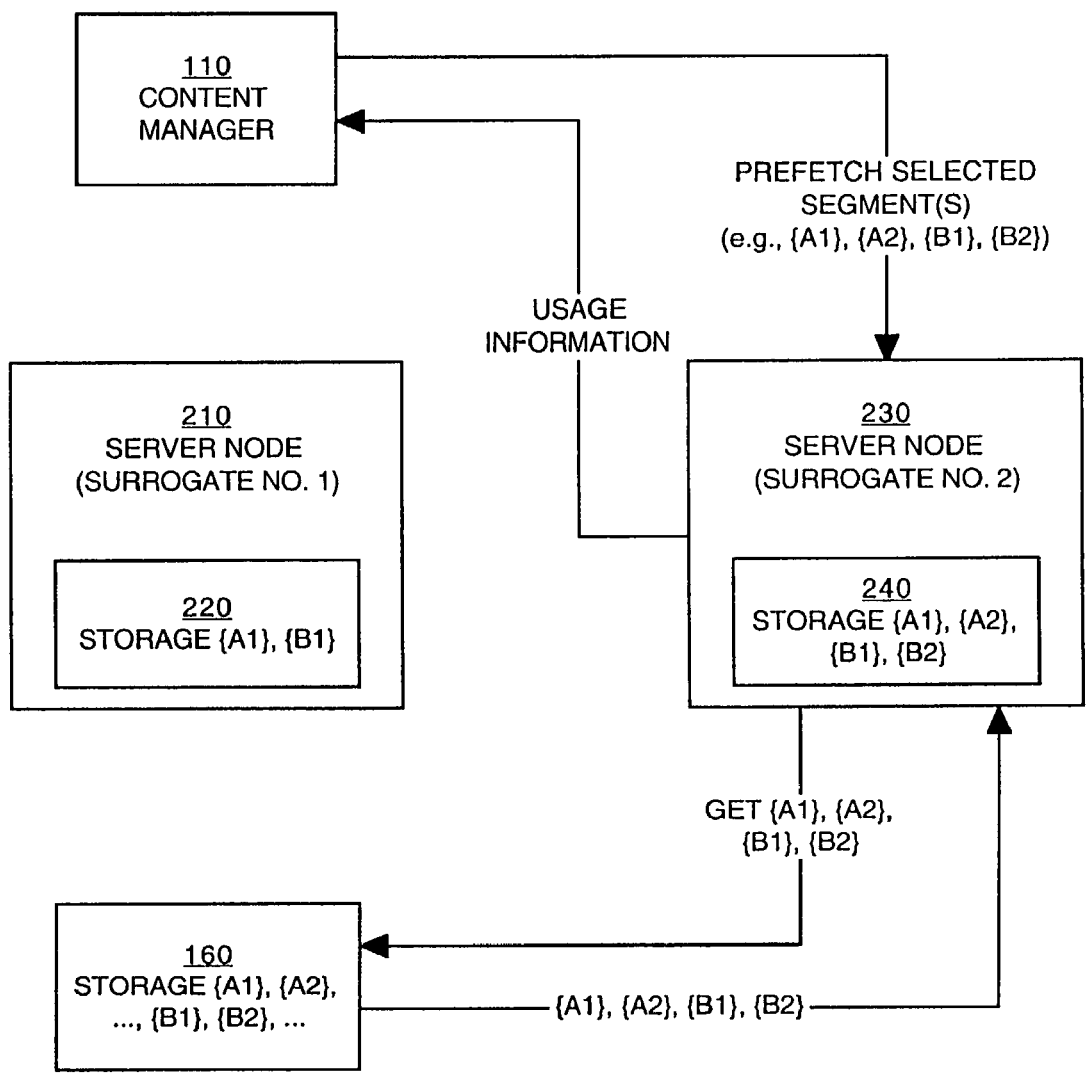

Considering the second of the segmentation factors mentioned above, the boundaries of the media segments are selected so as to be "friendly to the cache" (referring to the caches of the distributing server nodes; see FIGS. 3A and 3B). One aspect of this is that the length of each media segment may be designed to simplify filling of the cache. For instance, the media segments can be selected so that they have substantially the same size, or are integer multiples of a baseline size. In these instances, to make media segments the same size even when the content of the segments may be variable in length (e.g., in number of bits), the length of the valid media data can be identified, and bits occurring after the specified length would be ignored. Choosing the segment sizes to be approximately the same can facilitate replacement of one segment in a cache with another. Such a scheme can also allow cache space to be more efficiently utilized, with little fragmentation if any.

With regard to the third segmentation factor mentioned above, the boundaries of the media segment are selected recognizing that not all users will utilize an item of media content in its entirety, and that some items of media content will be more popular than others. For example, many people will often start watching a video at its beginning, but will stop watching after a relatively brief period of time. Accordingly, a media segment or segments may be defined to encompass the period at the beginning of a video that is frequently viewed. Portions of videos that may be frequently viewed may occur at points other than the beginning. For example, a live event that has been recorded may include portions of particularly high interest (e.g., a portion showing the home team scoring). A media segment or segments may be defined to encompass those periods as well.

Figure 2:
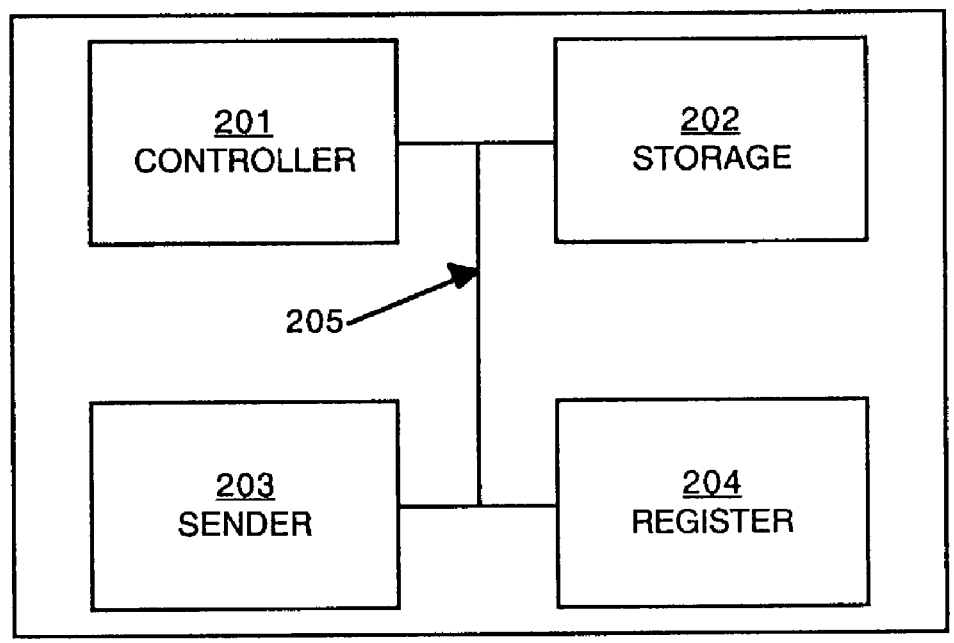
FIG. 2 is a block diagram of an exemplary server node upon which embodiments of the present invention may be practiced.

FIG. 2 is a block diagram of an exemplary server node 200 upon which embodiments of the present invention may be practiced. In this embodiment, server node 200 includes controller element 201, storage element 202, sender element 203, and register 204 (e.g., a memory element), each coupled to a bus 205. It is appreciated that server node 200 may include elements other than those shown and described, and that the functionality provided by different elements may be performed by a single element. For example, register 204 may be incorporated into storage element 202.

In the present embodiment, controller 201 is for processing information and instructions, in particular with regard to the retrieval of media segments that are to be stored in storage 202 and then forwarded to another node (e.g., a client or another server) by sender 203. Sender 203 typically functions by streaming media data to another node. Sender 203 may be either a wired or wireless transmitter. Register 204 is for storing information pertaining to the frequency of use of items of content and media segments, session durations as well as content start and stop times for content requests (e.g., start at content time 10 minutes, 30 seconds and end at content time 12 minutes, 15 seconds), the attributes of downstream (receiving) devices (client nodes or other server nodes), the attributes of the connection between server node 200 and downstream devices, and the attributes of downstream storage devices, for example. Other types of information that help to define which items of content are to be segmented, how they are to be segmented, and where the media segments are to be stored may also be collected in register 204.

FIGS. 3A and 3B illustrate a data flow for populating caches (e.g., storage 220 and storage 240) with media segments according to one embodiment of the present invention. In this embodiment, content manager 110 is communicatively coupled (via a wired or wireless connection) to server nodes 210 and 230. Server nodes 210 and 230 may also be referred to as surrogates (surrogate number 1 and number 2, respectively). In one embodiment, server nodes 210 and 230 can function as transcoders. Server nodes 210 and 230 may also include functionality allowing them to compress/decompress and/or encrypt/decrypt data.

Referring first to FIG. 3A, in the present embodiment, content manager 110 directs server node 210 to prefetch a selected media segment or segments (for example, media segments {A1} and {B1}). Server node 210 requests these segments from storage 160. The requested media segments are received from storage 160 and stored in storage (cache) 220. Note that content manager 110 may instead communicate directly with storage 160, directing that selected media segments be sent (downloaded) from storage 160 to a particular server node such as server node 210. Alternatively, in some cases as mentioned above, server node 210 (as well as other server nodes) may receive media segments directly from media segmenter 130 of FIG. 1.

Continuing with reference to FIG. 3A, in one embodiment, information ("usage information") describing the frequency of use of items of content and media segments, session duration as well as content start and stop times for content requests, the attributes of receiving devices (client nodes), and the attributes of storage devices can be accumulated and provided to content manager 110, as described above. This information may be automatically forwarded to content manager 110 either periodically or continually, or content manager 110 may request this information.

Referring next to FIG. 3B, in the present embodiment, content manager 110 directs server node 230 to prefetch one or more selected media segment(s) (e.g., {A1}, {A2}, {B1} and {B2}). Server node 230 requests these segments from storage 160. Note that, as mentioned above, there may be more than one storage element for storing media segments. In that case, server node 230 may request media segments from a storage element different than the storage element used by server node 210. In addition, a server may request a media segment from another server that hosts the media segment; for example, server node 230 could request media segments {A1} and {B1} from server node 210. Note also that, as in the above, content manager 110 may instead communicate directly with storage 160, or media segmenter 130 may communicate directly with server 230. In any case, the selected media segments are received by server node 230 and stored in storage (cache) 240. In the manner just described, different server nodes can be populated with the same or with different media segments.

Because each media segment is typically smaller in size and/or duration than an item of content in its entirety, more (different) items of content can be representatively stored in storage elements 220 and 240. That is, instead of storing a relatively small number of items of content in their entirety, a relatively large number of different items of contents are stored in part at each server node.

Figure 4:
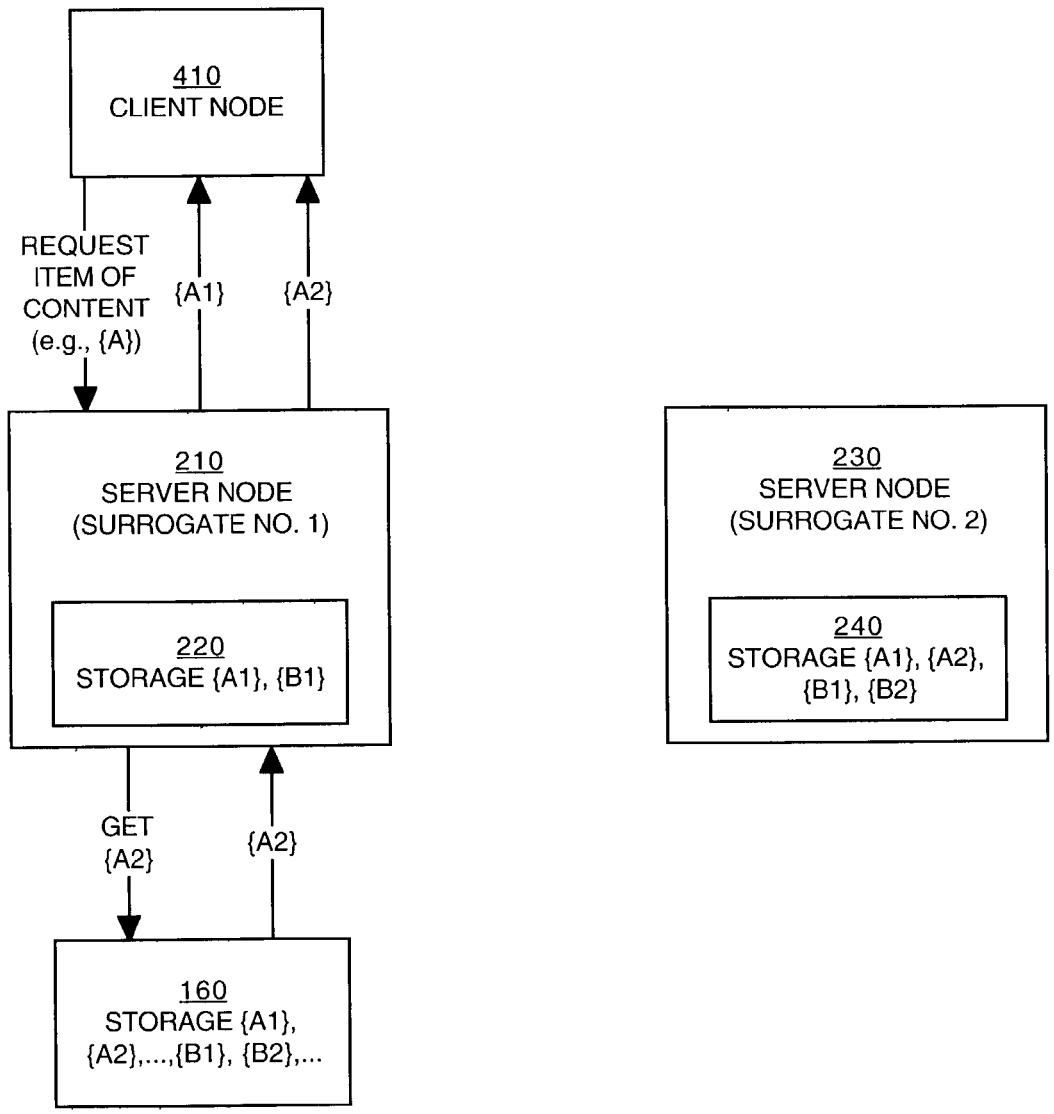
FIG. 4 illustrates a data flow for providing media segments to a client node according to one embodiment of the present invention.

FIG. 4 illustrates a data flow for providing media segments to a client node 410 according to one embodiment of the present invention. In this embodiment, client node 410 requests item of content A using a protocol such as but not limited to RTSP (real time streaming protocol). Server node 210 receives this request based on considerations such as but not limited to geographical proximity to client node 410. It is appreciated that server node 210 may provide service to a number of other client nodes in parallel with client node 410.

Server node 210, as described above, has media segment A1 cached in storage 220 but does not have item of content A, in its entirety, cached in storage 220. In the present embodiment, server node 210 forwards (e.g., streams) media segment A1 to client node 410 using a protocol such as but not limited to RTP (real-time transport protocol) or TCP (transmission control protocol). Substantially in parallel with the forwarding of media segment A1, server node 210 requests (prefetches) media segment A2 from storage 160. It is appreciated that media segment A2 can instead be prefetched from another server node (server node 230, for example). In any case, after the prefetch, media segment A2 is cached for subsequent forwarding to client node 410.

Note that media segment A2 may be the media segment immediately following media segment A1 in item of content A. That is, for example, media segment A1 may include the first minute of item of content A, and media segment A2 may include the portion of item of content A immediately following (contiguous with) media segment A1 (e.g., the second minute of content A). However, media segment A2 does not necessarily have to be the media segment immediately following media segment A1 in content A. For example, media segment A1 may be a portion of content A pertaining to a first scene or event of particular (perhaps popular) interest (e.g., the first score in a game), and media segment A2 may be a portion of content A pertaining to a second scene or event of particular (and perhaps popular) interest occurring after an interval of time has passed (e.g., the second score of the game). That is, there may be intervening media segments between media segment A1 and media segment A2.

Note also that the media segment following A1 does not necessarily have to be a media segment pertaining to item of content A. As explained above, for example, content A and content B may correspond to the same item of content but with different characteristics. For instance, content A may be encoded at a first bit rate and content B may be encoded at a second bit rate. In that case, a switch can be made from one bit rate to another at the segment boundaries. That is, media segment A1 can be forwarded by server node 210 to client node 410, followed by media segment B2. If media segment B2 is not hosted by server node 210, it can be prefetched as described above. Such a scheme may be useful for time-varying channels or when there is a portion of the content that a user would like to see with higher quality relative to another portion of the content.

Furthermore, note that a server node can start streaming a media segment before the entire media segment has been received (prefetched). In essence, it is only necessary that each byte or packet in the media segment be received before the time it is to be forwarded to a client node.

The prefetch of a media segment can be triggered by a variety of factors. For example, media segment A2 may be requested when the streaming of media segment A1 has continued for a certain period of time or to a certain point such as the half-way point, or when otherwise it is predicted that a client is likely to be interested in media segment A2. In general, a later media segment is requested and prefetched in a timely manner such that it is available to be forwarded to client node 410 when forwarding of the preceding media segment is completed.

From the perspective of client node 410, the prefetching of subsequent media segments is transparent; that is, client node 410 is not aware of whether or not content A is stored in entirety at server node 210. The media segments that constitute content A are made ready to be forwarded to client node 410 so that item of content A can be used at client node 410 without apparent disruption.

Thus, in a fashion similar to that just described, the media segment to be sent following media segment A2 is requested and prefetched at some point during the forwarding of one of the earlier media segments; that is, for example, a third media segment can be prefetched while either media segment A1 or A2 is being streamed. The media segments may be prefetched one-by-one, as described above, or they may be prefetched in quantity. For example, it may be possible to predict based on historical trends that a user interested in both media segments A1 and A2 will likely be interested in content A in its entirety. Consequently, some or all of the remaining media segments for content A can be prefetched in anticipation of the user's interest.

In the present embodiment, media segments are prefetched until the media session is either terminated or completed (e.g., the last segment of the item of content is forwarded to the requesting client). As used herein, a media session refers to the process(es) beginning when a client node initiates communication with a server node (e.g., the client requests an item of content) and ending when the client node terminates communication with the server node. Thus, a media session can include the forwarding of multiple instances of media segments for one or more items of media content.

Figure 5:
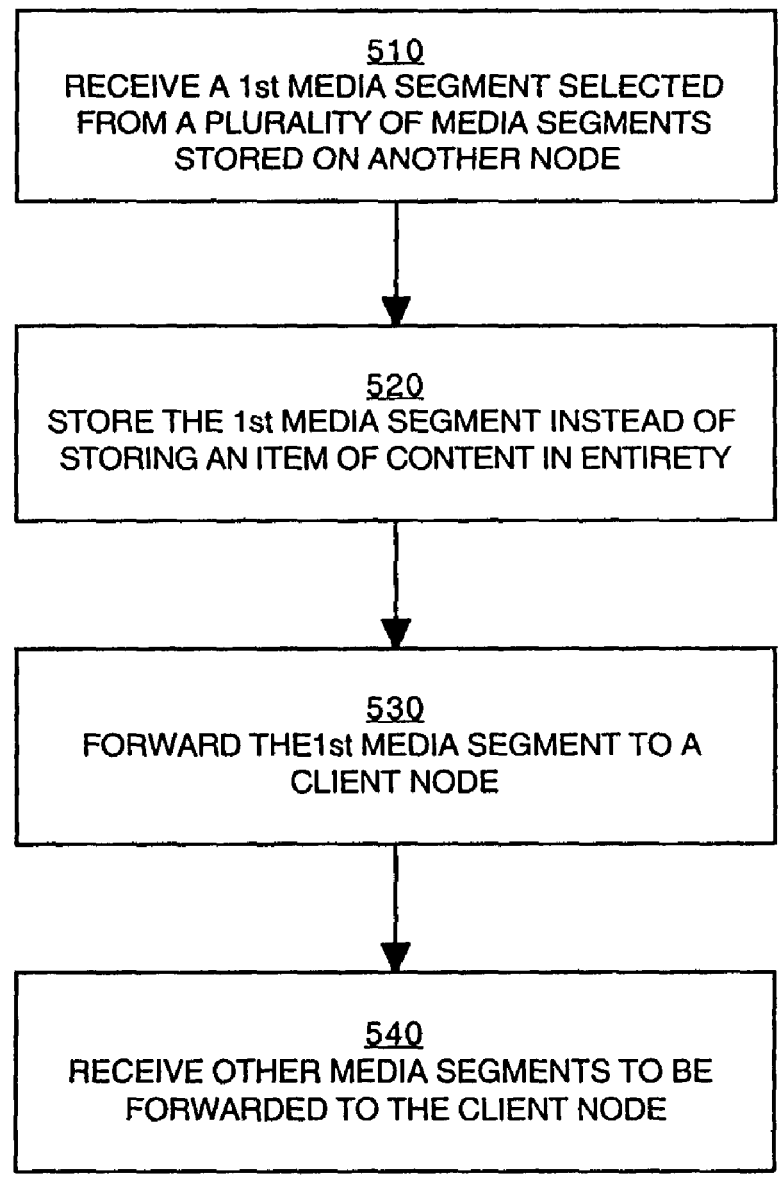
FIG. 5 is a flowchart of a method for distributing media data according to one embodiment of the present invention.

FIG. 5 is a flowchart 500 of a method for distributing media data according to one embodiment of the present invention. Although specific steps are disclosed in flowchart 500, such steps are exemplary. That is, embodiments of the present invention are well-suited to performing various other steps or variations of the steps recited in flowchart 500. It is appreciated that the steps in flowchart 500 may be performed in an order different than presented, and that not all of the steps in flowchart 500 may be performed. All of, or a portion of, the methods described by flowchart 500 may be implemented using computer-readable and computer-executable instructions which reside, for example, in computer-usable media of a computer system. Generally, flowchart 500 is implemented by server node 210 or server node 230 of FIGS. 3A and 3B.

In step 510, in the present embodiment, a first media segment, selected from a plurality of media segments stored on another node, is received. For example, with reference to FIGS. 3A and 3B, server node 210 receives media segment A1 selected from the plurality of media segments stored at storage element 160. However, server node 210 could instead receive media segment A1 from server node 230. Also, in some instances, media segment A1 may be provided to server node 210 directly from media segmenter 130 (FIG. 1).

In step 520 of FIG. 5, in the present embodiment, the first media segment is stored (cached) instead of storing a corresponding item of media content in its entirety. For example, again with reference to FIGS. 3A and 3B, server node 210 stores media segment A1 in lieu of storing item of media content A in its entirety.

In step 530 of FIG. 5, in the present embodiment, the first media segment is forwarded (e.g., streamed) to a requesting node. For example, with reference to FIG. 4, media segment A1 is forwarded to client node 410.

In step 540 of FIG. 5, in the present embodiment, other media segments that are to be forwarded to the requesting node are received (e.g., requested and prefetched). For example, again with reference to FIG. 4, server node 210 requests and prefetches media segment A2 from storage element 160, and forwards media segment A2 to client node 410. Note that media segment A2 could have been requested and prefetched from server node 230 instead of from storage 160, or directly from media segmenter 130 (FIG. 1).

In summary, in its various embodiments, the present invention provides a method and system thereof for delivering large items of media content, doing so in a manner that provides a number of advantages. These advantages include efficient use of available memory resources, so that content can be brought closer to requesting client nodes. As such, the present invention in its various embodiments also reduces response times, increases bandwidths to clients, reduces loss rates, improves scalability, and reduces requirements for network (backbone) resources. Moreover, these advantages are achieved in a manner that is transparent to clients.

Embodiments of the present invention are thus described. While the present invention has been described in particular embodiments, it should be appreciated that the present invention should not be construed as limited by such embodiments, but rather construed according to the following claims.

What is claimed is:

1. A method for distributing media data, said method comprising:
    receiving at a first node a first media segment selected from a plurality of media segments stored on a second node, said first media segment comprising a portion of an encoded item of media content, wherein boundaries of said first media segment are adaptively selected according to a trend determined by accumulating usage information comprising start times and stop times associated with requests for said item of media content, said start and stop times corresponding to points within said item of media content; and
    storing said first media segment in lieu of storing said item of media content in its entirety, wherein said first media segment can be forwarded to a third node.

2. The method of claim 1 further comprising:
    forwarding said first media segment to said third node in response to a request for said first media segment.

3. The method of claim 2 wherein said forwarding of said first media segment begins before said receiving of said first media segment at said first node is complete.

4. The method of claim 1 further comprising:
    storing selected other media segments.

5. The method of claim 4 further comprising:
    collecting information pertaining to use of said first media segment and said other media segments by other nodes.

6. The method of claim 5 further comprising:
    providing said information to a centralized node adapted to use said information to identify media segments to be stored by said first node.

7. The method of claim 1 further comprising:
    requesting a second media segment from another node.

8. The method of claim 7 wherein said second media segment comprises another portion of said item of media content.

9. The method of claim 7 wherein said second media segment comprises a portion of a second item of content.

10. The method of claim 7 wherein said requesting of said second media segment occurs such that said second media segment is available for forwarding when forwarding of said first media segment is completed.

11. The method of claim 1 wherein said item of media content corresponds to a real-time event and wherein said first media segment is received in real time.

12. A system for distribution of media data, said system comprising:
    a controller element;
    a storage element coupled to said controller element and adapted to receive and store a first media segment selected from a plurality of media segments stored on a first device, said first media segment comprising a portion of an encoded item of media content wherein said first media segment is stored by said storage element in lieu of storing said item of media content in its entirety, wherein boundaries of said first media segment are adaptively selected according to a trend determined by accumulating usage information comprising start times and stop times associated with requests for said item of media content, said start and stop times measured from the beginning of said item of media content; and a sending element coupled to said controller element and adapted to forward said first media segment to a second device.

13. The system of claim 12 wherein said sending element is adapted to stream said first media segment to said second device.

14. The system of claim 13 wherein said first media segment is streamed to said second device before said first media segment is completely received by said storage element.

15. The system of claim 12 wherein said storage element is adapted to store selected other media segments.

16. The system of claim 15 further comprising:
an information register coupled to said controller element and adapted to receive information pertaining to use of said first media segment and said other media segments by other devices.

17. The system of claim 16 wherein said information is used to identify media segments to be stored in said storage element.

18. The system of claim 12 wherein said controller element is adapted to request a second media segment from another device.

19. The system of claim 18 wherein said second media segment comprises another portion of said item of media content.

20. The system of claim 18 wherein said second media segment comprises a portion of a second item of media content.

21. The system of claim 18 wherein a request for said second media segment occurs such that said second media segment is available for forwarding when forwarding of said first media segment is completed.

22. The system of claim 12 wherein said item of media content corresponds to a real-time event and wherein said first media segment is received in real time.

23. A computer-usable medium having computer-readable program code embodied therein for causing a computer system to perform a method of distributing media data comprising:
receiving a first media segment selected from a plurality of media segments stored on a remote device, said first media segment comprising a portion of an encoded item of media content, wherein boundaries of said first media segment are adaptively selected according to a trend determined by accumulating usage information comprising start times and stop times associated with requests for said item of media content, said start and stop times measured from the beginning of said item of media content; and
storing said first media segment in a storage element in lieu of storing said item of media content in its entirety, wherein said first media segment can be sent to another device.

24. The computer-usable medium of claim 23 wherein said computer-readable program code embodied therein causes a computer system to perform said method comprising:
sending said first media segment to another device in response to a request for said first media segment.

25. The computer-usable medium of claim 24 wherein said sending of said first media segment starts before said receiving of said first media segment from said remote device is completed.

26. The computer-usable medium of claim 23 wherein said computer-readable program code embodied therein causes a computer system to perform said method comprising:
storing selected other media segments.

27. The computer-usable medium of claim 26 wherein said computer-readable program code embodied therein causes a computer system to perform said method comprising:
compiling information regarding use of said first media segment and said other media segments by other devices.

28. The computer-usable medium of claim 27 wherein said computer-readable program code embodied therein causes a computer system to perform said method comprising:
sending said information to a centralized device that uses said information to identify media segments to be stored in said storage element.

29. The computer-usable medium of claim 23 wherein said computer-readable program code embodied therein causes a computer system to perform said method comprising:
receiving a second media segment from another device.

30. The computer-usable medium of claim 29 wherein said second media segment comprises another portion of said item of media content.

31. The computer-usable medium of claim 29 wherein said second media segment comprises a portion of a second item of media content.

32. The computer-usable medium of claim 29 wherein said computer-readable program code embodied therein causes a computer system to perform said method comprising:
requesting said second media segment in time for said second media segment to be available for sending when sending of said first media segment is completed.

33. The computer-usable medium of claim 23 wherein said item of media content corresponds to a real-time event and wherein said first media segment is received in real time.

* * * * *